L. ST. D. ROYLANCE.
BALL BEARING GLAND.
APPLICATION, FILED DEC. 18, 1913.
1,204,822.
Patented Nov. 14, 1916.
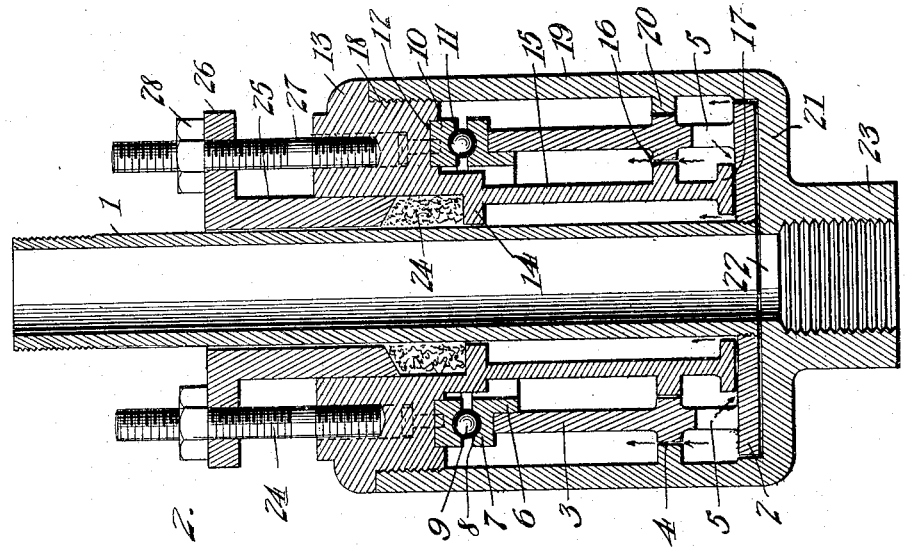
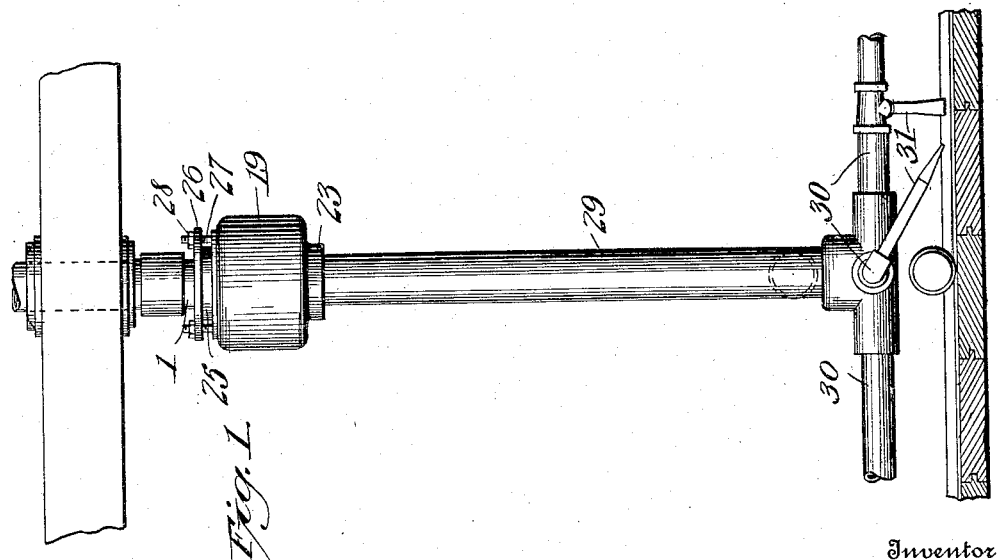
Witnesses
Inventor
Leon St. D. Roylance
By W. N. Roach Jr.
Attorney

UNITED STATES PATENT OFFICE.

LEON ST. D. ROYLANCE, OF SAN FRANCISCO, CALIFORNIA.

BALL-BEARING GLAND.

1,204,822.

Specification of Letters Patent.

Patented Nov. 14, 1916.

Application filed December 18, 1913. Serial No. 807,439.

*To all whom it may concern:*

Be it known that I, LEON ST. D. ROY-LANCE, a citizen of the United States of America, residing at San Francisco, in the county of San Francisco and State of California, have invented certain new and useful Improvements in Ball-Bearing Glands, of which the following is a specification.

This invention relates to ball-bearing glands and especially to glands intended for use in agitating amalgamators; the object being to so construct the gland as to prevent the solution which is passing through the gland from entering the ball race, thereby clogging the same and preventing the proper operation thereof.

A further object is to produce a simple, cheap and easily constructed device, of this character.

The gland hereinafter described is a modification of the ball-bearing gland shown and described in my application for patent on amalgamators, filed November 14, 1913, Serial No. 800,993.

With the aforesaid and such other objects in view as may hereinafter more fully appear, my device consists in the novel arrangement and construction of parts described in the following specification, more particularly pointed out in the claims and which are shown in the accompanying drawings, wherein:—

Figure 1 is an elevation of the device the same being shown mounted in an amalgamator, which is in broken section. Fig. 2 is a vertical sectional view of the gland.

Referring to said drawings by numerals:—
A pipe 1, which serves as the inlet to the gland, has one end suitably fastened, as here shown by threading, in an opening formed in the end 2 of a cylindrical member the walls 3 of which are formed with lateral ribs 4, extending in both directions from the cylindrical wall 3, and which are further provided, adjacent the end 2, with suitably spaced openings 5, for the purpose of allowing the liquid to pass freely to either side of the walls of cylindrical member 3.

Mounted upon the walls 3, at the open end of the cylindrical member of which said walls form a part, is a flanged collar, or ring 6, adapted to fit snugly against the inner surface of said walls 3 with the flange portion 7 thereof resting upon the end of said walls. A suitable groove 8, adapted to form a race for balls 9, is formed in the outer surface of said flange 7. Resting upon said balls 9 is a circular ring 10 provided, in one face thereof, with a groove 11, for the proper engagement of said balls 9. Ring 10 rests in a shallow circular slot 12 formed in a collar 13 which loosely encircles the aforesaid pipe 1, said ring being secured in slot 12 by screws, as here shown, or in any suitable manner. Collar 13 is provided with an inwardly projecting annular flange 14, having an easy sliding fit about the pipe 1, from which flange projects a cylindrical portion 15. Cylinder 15 has a laterally extending rib or flange 16 formed on its outer circumference, and said cylinder terminates, by preference, in a flat ring portion 17.

Secured to the reduced portion 18 of collar 13, by threaded means or otherwise, is a cylindrical shell 19 provided with an inwardly projecting annular flange 20 adapted to aline with the aforesaid ribs 4. Cylindrical shell 19 is provided with a head 21 having a circular aperture 22 adapted to aline with the opening of pipe 1. A hollow hub 23 extends outwardly from the end 21 and is threaded interiorly to receive the discharge pipe. Adjacent the aforesaid flange 14, in the space between the pipe 1 and collar 13, is placed suitable packing 24; the compression of said packing being regulated in any suitable manner, but preferably by a sleeve 25 formed with a flange 26, said flange being apertured to receive the bolts 27 suitably fastened in the collar 13. By means of nuts 28 which are carried by bolts 27, and engage flange 26, the sleeve 25 may be pressed down upon the packing 24 in any desired degree.

As can be readily seen from Fig. 2, when the whole is assembled clearance is provided between end 2 and end 21 and flat ring 17. Also there is a clearance space between the flanges 16 and 20 and ribs 4. Chambers also are formed between the cylinder 15 and pipe 1 and between cylindrical walls 3 and cylinders 15 and 19; the flanges 16 and 20 and ribs 4 further dividing said chambers.

The device operates as follows:—The liquid enters pipe 1, and discharges through aperture 22 and the discharge pipe 29 screwed or otherwise fastened into hub 23, from whence it flows into radial pipes 30 and through the inclined nozzles 31. The force of discharge from nozzles 31 sets up revolution of sleeve 25, collar 13 and its integral parts and shell 19 with the discharge pipe radial arms and nozzles. Pipe 1, head 2 and cylinder walls 3 remain stationary. As will be readily apparent the weight of the revolving parts is maintained on the balls 9. In the mean time the liquid, being under pressure enters, through the clearance spaces, heretofore pointed out, the chambers formed between the cylindrical members, thereby entrapping and compressing air in the space occupied by the ball race and consequently maintaining the same in a clean, dry condition. As will be noted, the flanges 16 and 20 and ribs 4 divide the chambers into entrance chambers and ball race chambers; the object thereof being to prevent sudden entrance of the liquid and possible squirting of the same onto the ball race.

Having described my invention, what I claim as new and desire to secure by Letters Patent, is:—

1. In a device of the character described, a pipe, a shell revolubly mounted on said pipe, anti-friction means interposed between said shell and said pipe, and mechanism carried by said shell and said pipe for the entrapment of air about said anti-friction means.

2. In a device of the character described, a pipe, a shell revolubly mounted on said pipe, anti-friction means interposed between said pipe and shell, and an air compression chamber formed between said pipe and said shell to entrap air about said anti-friction means.

3. In a device of the character described, a pipe, a cylinder, a head for said cylinder said head being secured to said pipe, a ball race mounted on the open end of said cylinder, balls in said race, a shell revolubly mounted on said balls and encircling said pipe, and an air compression chamber surrounding said ball race.

4. In a device of the character described, a pipe, a cylindrical member, a head for said cylindrical member, said head being provided with a suitable opening for securing the same to said pipe, a flanged collar mounted on said cylindrical member, the flanged portion of said collar being provided with a groove, balls in said groove, a collar revolubly mounted on said balls, a cylindrical portion integral with said collar and adapted to enter the aforesaid cylindrical member, a shell secured to the aforesaid collar adapted to inclose the aforesaid cylindrical members, and means for entrapping air about the aforesaid balls.

5. In a ball bearing gland, a stationary liquid conveying member, a member revolubly mounted thereon, anti-friction means interposed between said members, and mechanism carried by said members for the entrapment of air about said anti-friction means.

6. In a ball bearing gland, a liquid conveying pipe, a shell revolubly mounted on said pipe, anti-friction means interposed between said pipe and shell, and an air compression chamber formed between said pipe and said shell.

In testimony whereof I hereunto affix my signature in presence of two witnesses.

LEON ST. D. ROYLANCE.

Witnesses:
A. J. HENRY,
C. A. TROTH.

Copies of this patent may be obtained for five cents each, by addressing the "Commissioner of Patents, Washington, D. C."